(12) United States Patent
Martin

(10) Patent No.: US 11,099,094 B2
(45) Date of Patent: Aug. 24, 2021

(54) PRESSURE MEASURING PROBE, IN PARTICULAR FOR AIRCRAFT

(71) Applicant: THALES, Courbevoie (FR)

(72) Inventor: Frédéric Martin, Valence (FR)

(73) Assignee: Thales, Courbevoie (FR)

( * ) Notice: Subject to any disclaimer, the term of this patent is extended or adjusted under 35 U.S.C. 154(b) by 303 days.

(21) Appl. No.: 15/987,769

(22) Filed: May 23, 2018

(65) Prior Publication Data

US 2018/0348076 A1   Dec. 6, 2018

(30) Foreign Application Priority Data

Jun. 2, 2017  (FR) ................................ FR 17 00591

(51) Int. Cl.
  *G01L 19/06* (2006.01)
  *G01P 5/165* (2006.01)

(52) U.S. Cl.
  CPC .............. *G01L 19/06* (2013.01); *G01P 5/165* (2013.01)

(58) Field of Classification Search
  CPC .................................. G01L 19/06; G01P 5/165
  USPC ........................................................ 73/700
  See application file for complete search history.

(56) References Cited

U.S. PATENT DOCUMENTS

| 6,490,510 | B1 * | 12/2002 | Choisnet ................... G01P 5/14 |
| | | | 701/14 |
| 7,716,980 | B1 * | 5/2010 | Colten .................... G01P 5/165 |
| | | | 73/170.02 |
| 7,828,477 | B2 * | 11/2010 | Benning .............. G01K 13/028 |
| | | | 374/109 |
| 9,696,187 | B2 * | 7/2017 | Whalen ...................... G01F 1/34 |
| 2015/0059465 | A1 * | 3/2015 | Leblond ................. B64D 43/02 |
| | | | 73/170.02 |
| 2017/0029124 | A1 | 2/2017 | Hodot et al. |

FOREIGN PATENT DOCUMENTS

| EP | 2 385 377 A1 | 11/2011 |
| GB | 857 427 A | 12/1960 |

OTHER PUBLICATIONS

Search Report of related application FR 17 00591 dated Sep. 12, 2017.
Written Opinion of related application FR 17 00591 dated Sep. 12, 2017.

\* cited by examiner

*Primary Examiner* — Nimeshkumar D Patel
*Assistant Examiner* — Jean F Morello
(74) *Attorney, Agent, or Firm* — Knobbe, Martens, Olson & Bear, LLP

(57) ABSTRACT

A pressure measuring probe, in particular for use in an aircraft is disclosed. In one aspect, the pressure measuring probe includes at least one acquisition tube, including a capability for discharging water and captured crystals contained in the atmosphere, where the discharge capability includes a drainage hole arranged in a rear partition of the tube, in the axis of symmetry thereof and in the flow direction of the flow of air.

4 Claims, 1 Drawing Sheet

PRESSURE MEASURING PROBE, IN PARTICULAR FOR AIRCRAFT

CROSS-REFERENCE TO RELATED APPLICATIONS

This patent application claims the benefit under 35 U.S.C. § 119 of French Application No. FR 17 00591 filed on Jun. 2, 2017 which is hereby incorporated by reference in its entirety.

BACKGROUND

Technological Field

The described technology generally relates to a pressure measuring probe, in particular for an aircraft.

Description of the Related Technology

It is known that in the related technology, for example in aeronautics and in particular on board aircraft, probes exist for measuring total and static pressure, which make it possible, for example, to calculate the speed and altitude of the aircraft.

In general, such probes are pitot tubes, static probes or static pitot probes.

All of these measuring probes for this type of application include at least one acquisition tube.

However, these tubes have the drawback in particular of capturing water and crystals present in the atmosphere.

SUMMARY OF CERTAIN INVENTIVE ASPECTS

It is therefore necessary to design a system, in these probes, for discharging this water and these crystals in order to prevent them from accumulating in the probe and clogging it.

These evacuation systems integrated into these probes are commonly called "water traps," and are for example made up of partitions or labyrinths arranged in the tube.

This or these partitions then make it possible to stop the water and the crystals, which are next discharged through at least one drainage hole arranged in the partition of the tube, perpendicular to the flow of air traversing the probe, in a low point and upstream from this partition.

Measuring probes of this type are thus most often designed with two opposite drainage holes, so that they can be used on both sides of the fuselage of an aircraft.

Of course, the probes that are mounted on the nose of an aircraft or those that are mounted on only one side of the fuselage of an aircraft are typically designed with a single drainage hole.

The pressure tap, making it possible to send the pressure to a pressure sensor, is typically arranged behind the assembly made up of the drainage hole and the partition(s) of the water trap.

According to other embodiments, this pressure tap can also be offset toward the front of the probe using a pressure tap conduit.

However, solutions of the related technology have a certain number of drawbacks.

Indeed, if the water trap system becomes clogged, and for example in case of heavy rain, periodic freezing or use outside its performance range, the water may pass behind the partitions of the water trap of the probe.

It is then extremely difficult to discharge due to these same partitions.

In case of leak in the on board pneumatic grid of the aircraft, it is possible, in some systems, to trigger a circulation of water that will next be found in the circuit of the aircraft.

In case of high crystal concentration, the latter directly impact and cool the partition. The further for the partition is, the greater the cooling thereof is, with the known risks, following the loss of the corresponding information for piloting of the aircraft.

The described technology therefore aims to resolve these problems.

To that end, one inventive aspect of the described technology relates to a pressure measuring probe in particular for an aircraft, of the type including at least one acquisition tube, including a capability for discharging water and captured crystals contained in the atmosphere, wherein the discharge capability comprises a drainage hole arranged in a rear partition of the tube, in the axis of symmetry thereof and in the flow direction of the flow of air, and in that the acquisition tube includes a pressure tap capability placed upstream from the rear partition of the tube.

According to other features of the probe according to the described technology, considered alone or in combination:
- the pressure tap capability comprises a pressure tap hole arranged in the wall of the tube;
- the hole has an axis perpendicular to the axis of symmetry of the tube;
- the hole is arranged in the upper part of the tube;
- the pressure tap capability comprises a pressure tap conduit traversing the wall of the tube;
- the conduit is tilted toward the rear partition of the tube;
- the conduit is provided in the lower part of the tube;
- the pressure tap end of the conduit is located at a level at least equal to that of the drainage hole.

BRIEF DESCRIPTION OF THE DRAWINGS

The described technology will be better understood upon reading the following description, provided solely as an example, and done in reference to the appended drawings, in which.

DETAILED DESCRIPTION OF CERTAIN INVENTIVE EMBODIMENTS

Figure 1:
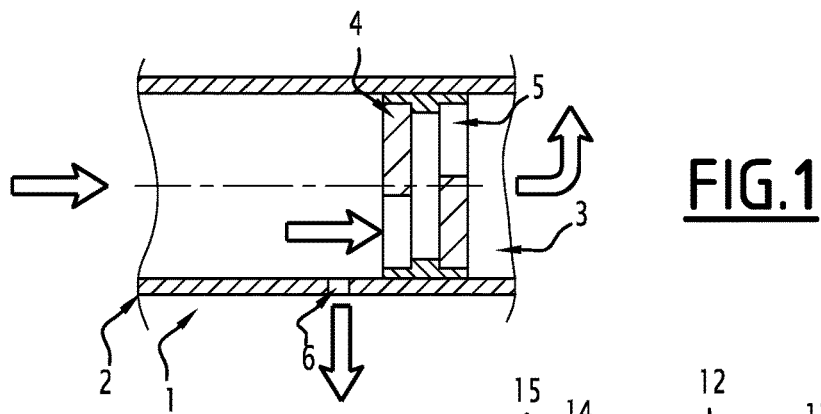
FIGS. 1 and 2 show partial schematic sectional views illustrating two example embodiments of pressure measuring probes of the state of the art.
Figure 2:
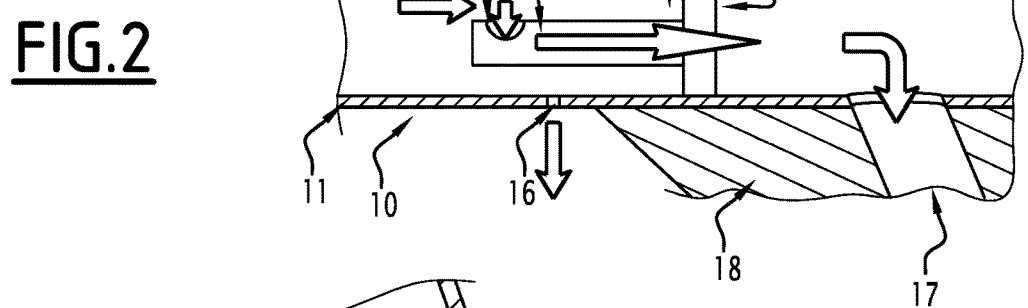

The figures, and in particular FIGS. 1 and 2, in fact illustrate pressure measuring probes in particular for an aircraft, as they are in the related technology.

In FIG. 1, the pressure measuring probe is designated by general reference 1 and includes at least one acquisition tube designated by general reference 2.

In FIG. 1, a single acquisition tube is illustrated, but of course a probe of this nature including several acquisition tubes of this type can be considered.

A water trap-forming capability, designated by general reference 3 in this FIG. 1, are also provided in the tube.

This water trap 3 for example includes two transverse partitions 4 and 5, parallel and provided with offset orifices, to form a labyrinth or a baffle, which makes it possible to trap the water and the particles such as crystals, contained in the atmosphere traversing the tube.

The water and these particles are then discharged outside the tube through a drainage hole, designated by general reference 6, arranged perpendicularly and in the lower part of the tube in front of the trap.

The pressure tap can thus be done downstream from the trap-forming capability, as illustrated in FIG. 1.

FIG. 2 shows an alternative embodiment of such a measuring probe.

In FIG. 2, the probe is designated by general reference 10 and the tube by general reference 11.

This tube 11 still includes a capability for trapping water and particles, designated by general reference 12.

In fact, the trapping capability for example comprises a transverse partition 13, associated with an axial conduit 14, provided with a transverse passage hole 15 for the captured flow of air.

Here again, this conduit 14 and this hole 15 form a baffle or a labyrinth, making it possible to provide separation between the water and the crystals from the rest of the flow traversing the tube.

In this example embodiment as well, the water and crystals are discharged through a drainage hole, designated by general reference 16, arranged perpendicularly in the wall of the partition of the tube, in the lower part thereof and upstream from the trapping capability.

In this case as well, the pressure tap can be done downstream from the trapping capability through a conduit, designated by general reference 17, arranged in a wing-shaped portion of the pressure probe, this portion being designated by general reference 18 in FIG. 2.

As previously indicated, these structures have a certain number of drawbacks in terms of the separation of the water and particles and the clogging risks of the probe.

To resolve these problems, in the measuring probe according to the described technology, the capability for discharging water and particles is formed by a drainage hole arranged in a rear partition of the tube, in the axis of symmetry thereof and in the flow direction of the flow of air in this tube.

Figure 3:
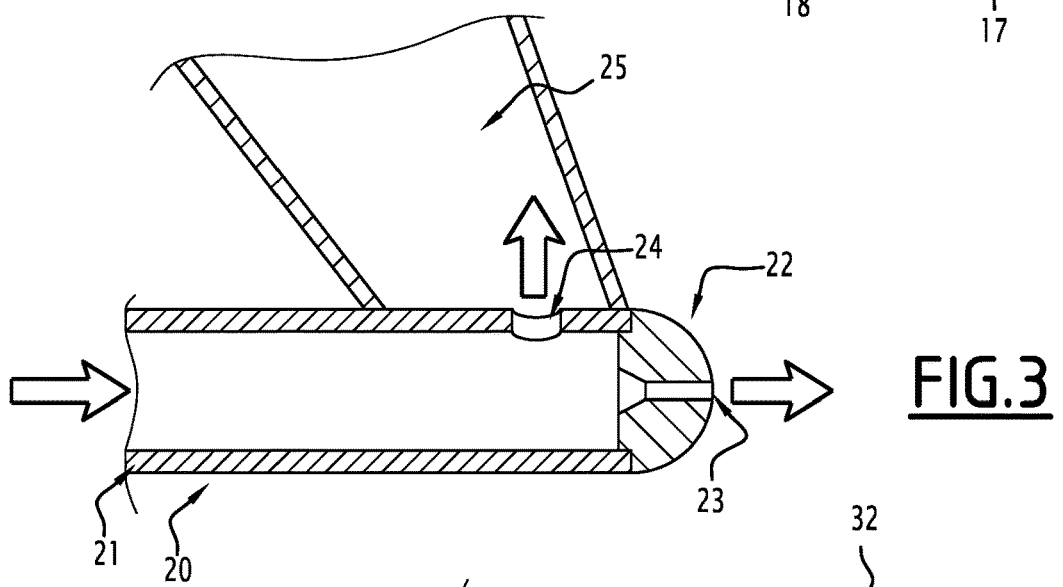
FIGS. 3 and 4 show partial schematic sectional views illustrating two example embodiments of pressure measuring probes according to the described technology.

This is for example illustrated in FIG. 3, which shows a first embodiment of a measuring probe according to the described technology.

This measuring probe is designated by general reference 20 in FIG. 3, and still includes an acquisition tube, designated by general reference 21.

At its rear end, this tube includes an end partition, designated by general reference 22, in which a drainage hole is arranged, designated by general reference 23.

This drainage hole is thus arranged in the axis of symmetry of the tube and in the flow direction of the flow of air.

The tube 21 also includes a pressure tap capability placed upstream from the rear partition 22 of the tube.

The pressure tap capability for example comprises a pressure tap hole, designated by general reference 24 in FIG. 3, arranged in the wall of the tube, perpendicular to the axis of symmetry of this same tube.

In the example described in FIG. 3, the hole 24 is arranged in the upper part of the tube and communicates with a buffer-forming volume 25, providing the interface between the tube and the rest of the measuring system.

One can then see that such a structure has a certain number of advantages relative to the structures of the related art.

Indeed, in the probe according to the described technology, the drainage system does not use a partition or labyrinth making up a water trap.

The drainage of the latter is in fact done directly through a drainage hole positioned in the flow direction of the flow.

Such a structure then has a self-draining design, i.e., all of the water potentially taken in can flow through the front of the tube or the drainage hole at the rear thereof.

With such a hole located behind the tube, the differential pressure between the inside and the outside thereof, at the hole, is larger than in the traditional configurations, which improves the discharge of the water.

Furthermore, the particular position of this drainage hole behind the tube makes it possible to reduce the cooling effect related to the crystals and to avoid refreezing effects of the drained water, also known as "run-back" effect.

Lastly, the inspection of such a drainage hole is also made easier and only requires a simple lighting capability.

Figure 4:
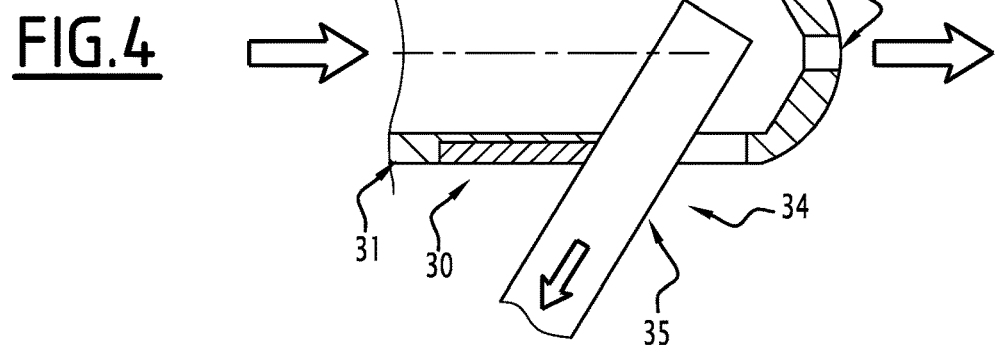

Of course, still other embodiments may also be considered, like that illustrated in FIG. 4.

FIG. 4 indeed shows an alternative embodiment of a measuring probe according to the described technology, which is designated by general reference 30.

This probe 30 still includes a tube 31 provided with a rear partition 32 equipped with a drainage hole 33.

This tube 31 is still associated with a pressure tap capability, designated by general reference 34.

In this example embodiment illustrated in FIG. 4, the pressure tap capability is in fact made up of a pressure tap conduit 35 traversing the wall of the tube.

This conduit 35 is then for example provided in the lower part of this tube 31 and tilted toward the rear partition 32 of the latter.

It will also be noted that, in the illustrated example, the pressure tap end of this conduit 35 is located at a level at least equal to that of the drainage hole designated by general reference 33, i.e., above the axis of symmetry of this tube.

Thus, such a pressure measuring probe is simpler and less expensive to produce, while having improved reliability relative to the probes of the related art.

Of course, still other embodiments of this probe can be considered.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A pressure measuring probe for an aircraft, comprising: at least one acquisition tube including a capability for discharging water and captured crystals contained in the atmosphere, wherein the discharge capability comprises a drainage hole arranged in a rear partition of the tube, in the axis of symmetry thereof and in the flow direction of the flow of air, the rear partition comprising a rear wall having a surface extending in a plane perpendicular to the axis of symmetry and facing an inner volume of the acquisition tube, wherein the acquisition tube includes a pressure tap capability placed upstream from the rear partition of the tube, wherein the pressure tap capability comprises a pressure tap hole arranged in the wall of the tube, and wherein the pressure tap hole has an axis perpendicular to the axis of symmetry of the tube.

2. The pressure measuring tap according to claim 1, wherein the pressure tap hole is arranged in the upper part of the tube.

3. An aircraft, comprising: a pressure measuring probe comprising at least one acquisition tube including a portion for discharging water and captured crystals contained in the atmosphere, wherein the discharge portion comprises a drainage hole arranged in a rear partition of the tube, in the axis of symmetry thereof and in the flow direction of the flow of air, the rear partition comprising a rear wall having a surface extending in a plane perpendicular to the axis of symmetry and facing an inner volume of the acquisition tube, wherein the acquisition tube includes a pressure tap portion placed upstream from the rear partition of the tube, wherein the pressure tap capability comprises a pressure tap hole arranged in the wall of the tube, and wherein the pressure tap hole has an axis perpendicular to the axis of symmetry of the tube.

4. The pressure measuring probe according to claim 1, wherein the drainage hole is configured to be open during flight causing a differential pressure between the inside and the outside of the tube.

* * * * *